Aug. 30, 1966   F. E. NORLIN   3,269,327
PRESSURE LOADED GEAR PUMP
Filed Nov. 4, 1964   3 Sheets-Sheet 1

Inventor:
Francis E. Norlin
By: Roger Schmiege  Atty.

Aug. 30, 1966  F. E. NORLIN  3,269,327
PRESSURE LOADED GEAR PUMP
Filed Nov. 4, 1964  3 Sheets-Sheet 2
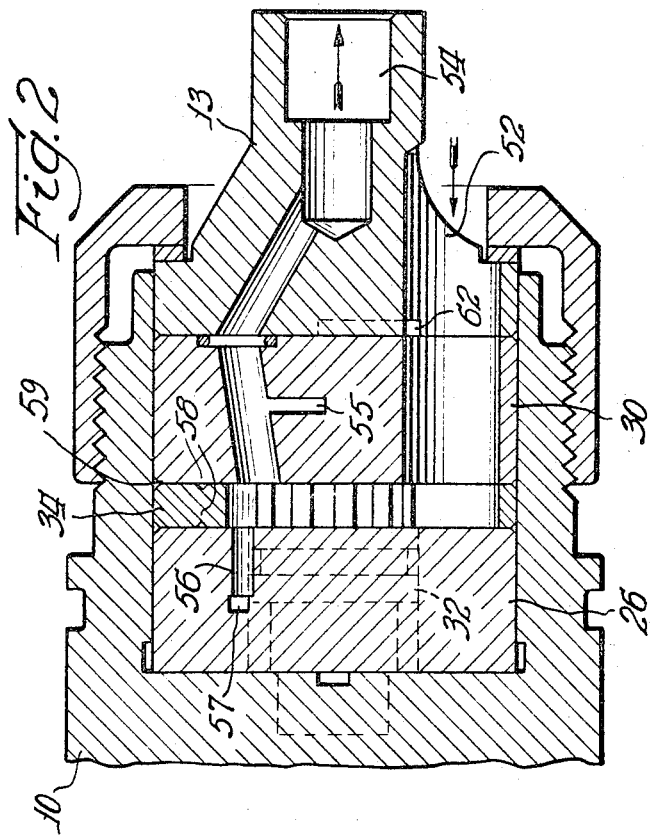
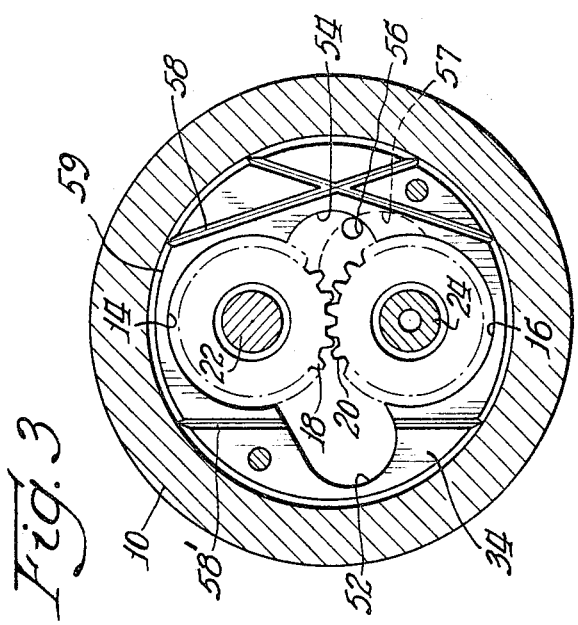
Inventor:
Francis E. Norlin
By: Roger Schmiege Atty.

Aug. 30, 1966  F. E. NORLIN  3,269,327
PRESSURE LOADED GEAR PUMP
Filed Nov. 4, 1964  3 Sheets-Sheet 3
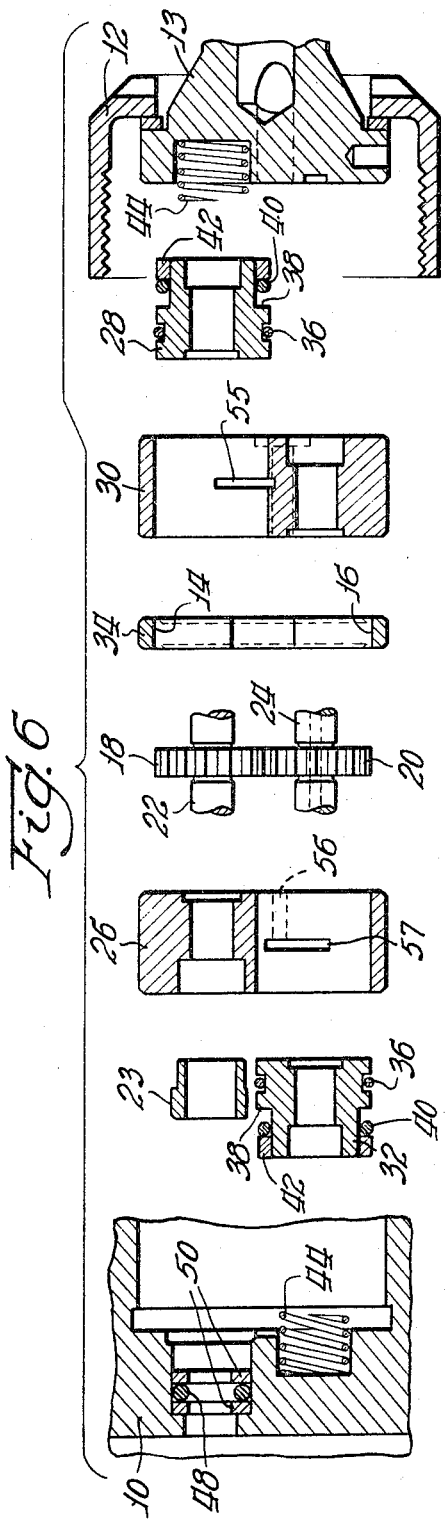
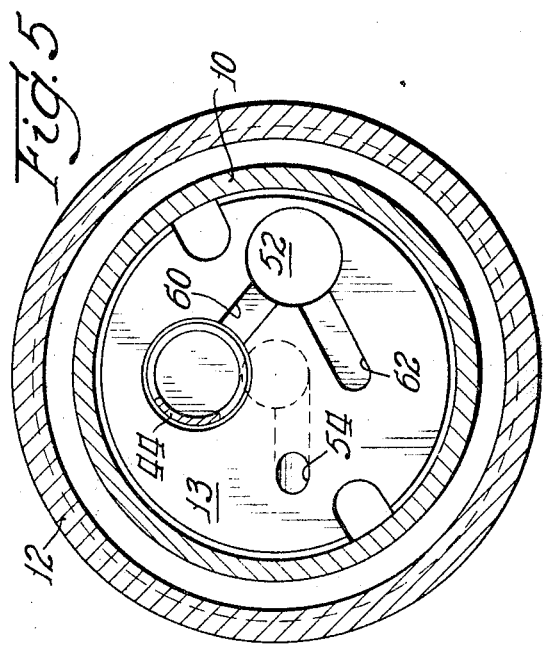
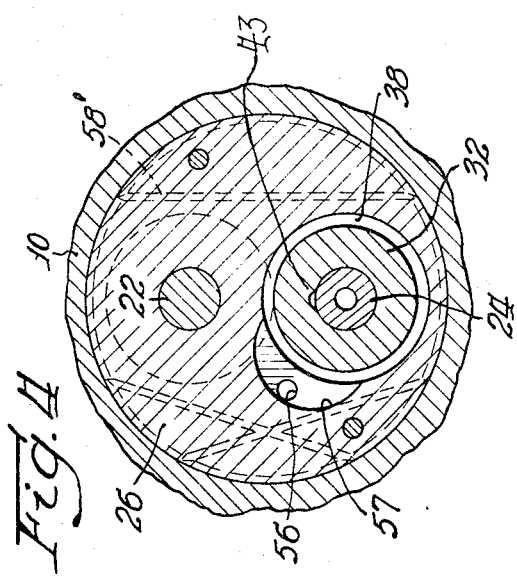
Inventor:
Francis E. Norlin
By: Roger Schmiege  Atty.

United States Patent Office 3,269,327
Patented August 30, 1966

3,269,327
PRESSURE LOADED GEAR PUMP
Francis E. Norlin, Chesterland, Ohio, assignor to Borg-Warner Corporation, Chicago, Ill., a corporation of Illinois
Filed Nov. 4, 1964, Ser. No. 408,780
6 Claims. (Cl. 103—126)

The present invention relates to gear pumps and more particularly to pressure loaded gear pumps having axially movable pressure loadable bearing members.

The conventional gear pumps or motors include a housing having a pair of parallel intersecting bores formed therein, a pair of intermeshing rotatable gears disposed respectively in the bores and bearing members disposed in the bores for rotatably supporting the gears within the housing. The bearing members normally comprise two pairs of adjacent bearings, one pair of bearings being fixed with respect to the housing and the other pair of bearings being adapted to be axially moved into sealing engagement with the respective side faces of the gears to provide pumping seals therewith. The axially movable bearings are normally each provided with a rear motive surface which is subject to the application of the force of the outlet fluid pressure whereby the fluid pressure tends to axially move the bearing into sealing engagement with the respective gear side face. The bearings of the conventional pump are generally cylindrical in shape to conform to the intersecting bores, however, due to their shape, it is the normal procedure to remove a portion of the bearing at the line of intersection to provide what is known as bearing "flats." The normal design of a pressure loadable bearing having the aforementioned "flats" has the disadvantage of being exceedingly difficult to fit at the bearing intersection without substantial leakage along this "flat" portion. It has been proposed to provide integral bushings having a "figure-eight" design with the elimination of this bearing flat, however, the machining of "figure-eight" design bearings is a difficult and uneconomical operation.

Briefly described, the present invention provides static body bearing means, i.e., those bearings that are fixed relative to the housing, of a sufficiently large size to carry the axially movable bearing means mounted therein. Thus, in accordance with this invention, each body bearing contains an axially movable bearing and each gear has an axially movable bearing associated therewith. The body bearings are mounted on opposite sides of the gears and support journals on alternate gears whereby each axially movable pressure loadable bearing will support a journal of a gear, which journal is opposite a journal supported by a body bearing. It will be noted that this invention substantially eliminates the necessity of hand fitting of bearing slats and the possibility of leakage from bearing flats as well as the excessive machining operations necessitated by integral "figure-eight" type bearings.

The advantages of the present invention will become apparent from the following detailed description of a gear pump on which this invention may be utilized. The description of the invention will be understood when taken in conjunction with the drawings wherein:

FIGURE 2 is a fragmentary sectional view taken on lines 2—2 of FIGURE 1;

FIGURE 3 is a transverse sectional view taken along the lines 3—3 of FIGURE 1;

FIGURE 4 is a transverse sectional view taken along lines 4—4 of FIGURE 1;

FIGURE 5 is a transverse sectional view taken along lines 5—5 of FIGURE 1; and

FIGURE 6 is an exploded view of the gear pump and associated parts.

Figure 1:
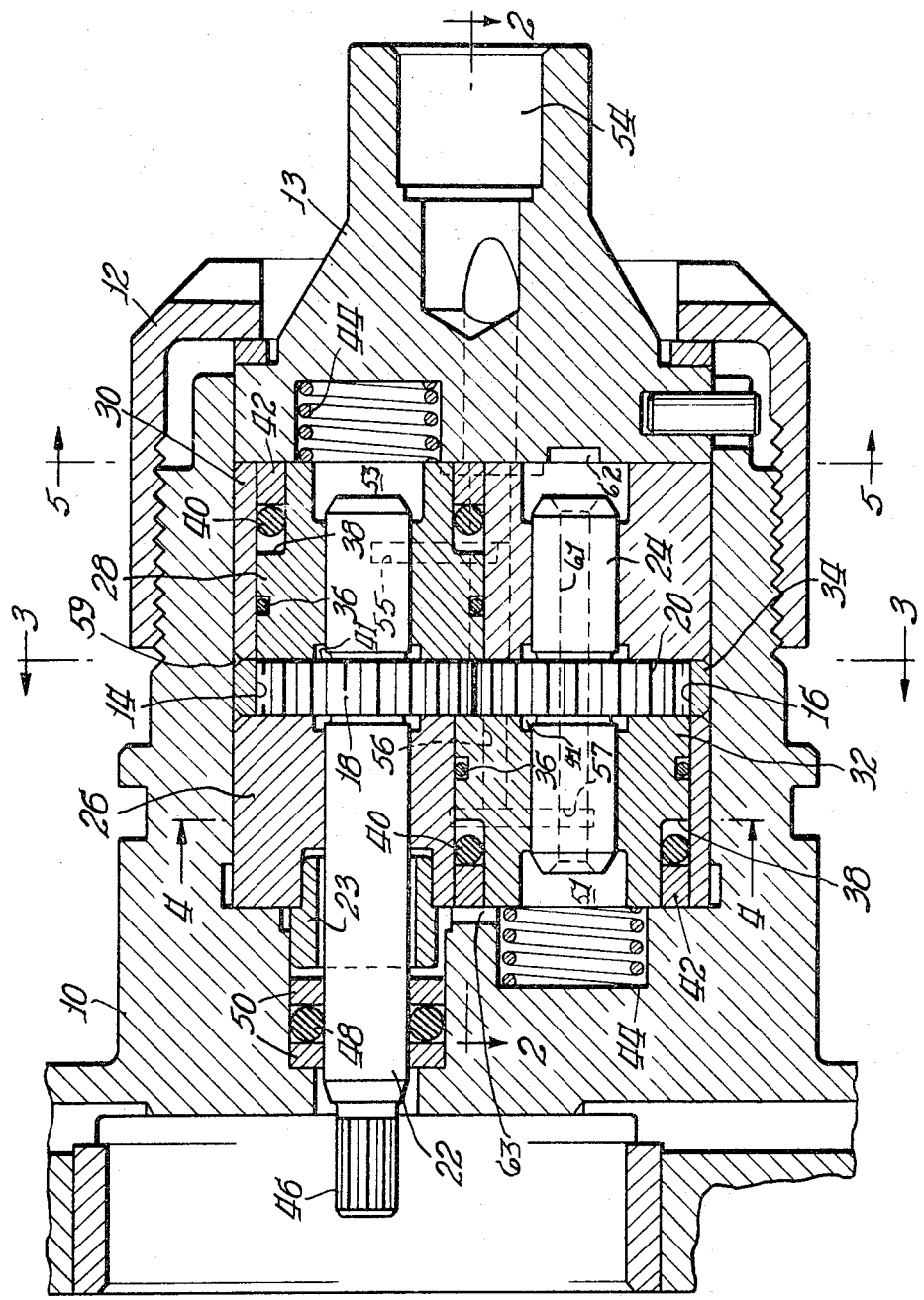
FIGURE 1 is a cross-sectional view of a gear pump embodying the features of this invention.

Referring now more particularly to the drawings, FIGURE 1 is a cross-sectional view of a gear pump having a housing 10 with a cap member 12 threadedly attached thereto. Cap member 12 retains a closure member 13. The housing 10 and closure member 13 cooperate to define a cavity containing pumping gear chambers 14 and 16 which are arranged to receive in complementary relationship intermeshing rotatable pumping gears 18 and 20. Gears 18 and 20 are journalled on integral shafts 22 and 24 respectively, in a manner well known in the art.

Shaft 22, as shown, is received in a static body bearing 26, i.e., a bearing that is fixed with respect to the housing, on the left side of gear 18 and an axially slidable pressure loadable bearing 28 on the right side of gear 18. Shaft 22 is held in proper drive alignment by pilot ring 23 contained in body bearing 26, which ring and bearing supports the input drive end of shaft 22.

Shaft journal 24, as shown, is received in a static body bearing 30 on the right side of gear 20 and an axially slidable pressure loadable bearing 32 on the left side of gear 20. Body bearings 26 and 30 are sufficiently large to journal shafts 22 and 24 as well as carry the pressure loadable bearings 32 and 28 respectively. Thus, pressure loadable bearing 32 is mounted within a bore of body bearing 26 and pressure loadable bearing 28 is mounted within a bore of body bearing 30.

It will be noted that there are no bearing flats to fit between the bearings that are mounted on shaft 22 and those that are mounted on shaft 24. Normally, both the static body bearings and pressure loadable bearings must be ground to very close tolerances to fit one above the other without leakage therebetween.

Body bearings 26 and 30 are axially separated from each other by means of a spacer plate 34 which is of the same thickness as the gears 18 and 20.

The axially movable pressure loadable bearing members 28 and 32 are in communication with outlet pressure at their rear radial surfaces 38 which pressure is exerted between rear surfaces 38 and sealing rings 40 to urge bearings 28 and 32 into sealing engagement with gears 18 and 20 respectively to provide a pumping seal therewith. There are O-rings 36 which extend around bearings 28 and 32 to prevent axial leakage of high pressure fluid from the rear surfaces 38 of bearings 28 and 32 around the periphery thereof and back to the inlet side of the pump. Sealing rings 40 are backed by spacer rings 42 which abut the housing 10 from bearing 32 and closure member 13 of the gear pump from bearing 28. Axially movable bearings 28 and 32 are also urged into sealing engagement with gears 18 and 20 respectively by springs 44 which maintain pressure upon these bearings during low pressure operation, at starting, and during static conditions.

In accordance with conventional pump design, the journal shaft 22 of the upper driving gear 18 extends to the left and is splined at 46 for coupling with a power source (not shown). It will be noted that shaft 22 is sealed with a sealing ring 48 which is situated between back-up rings 50.

It is well known, that in order to control the degree of pressure loading in a pressure loaded gear pump as herein described, it is necessary to provide a relief recess on chamber 41. This chamber may be formed either in the gear side face engaging surface of each pressure loadable bushing or in the gear side face or a combination of both as shown. The relief recess, when formed, is located inwardly of the roots of the gear teeth and communicates to a zone of lower than discharge pressure. Communication to a zone of lower than discharge pressure may be provided by an axially extending passage 43 formed in the cylindrical inner wall of each of the pressure loadable bearings (best shown in FIGURE 4).

FIGURE 2 shows the inlet port 52 and outlet or discharge port 54 and the manner in which the axially slidable pressure loadable bearings receive pressure loading from outlet pressure. As indicated, outlet port 54 is placed in communication with the rear radial surface 38 of bearing 28 by means of arcuate passage 55. The pressure on surface 38 moves bearing 28 axially to the left whereby the face of bearing 28 is placed in sealing engagement with the face of gear 18. With respect to bearing 32 (shown in dotted outline), there is a pressure loading port 56 in communication with the discharge side of the pump which port provides discharge pressure to the rear radial surface 38 of bearing 32. The pressure on surface 38 of bearing 32 moves bearing 32 axially to the right as viewed in the drawing to place the face of bearing 32 in sealing engagement with the face of gear 20.

FIGURE 3 shows the face of spacer plate 34 and the relative positions of the inlet 52, outlet 54, pressure loading port 56, and arcuate passage 57 which joins port 56 with the rear radial surface 38 of bearing 32. There are grooves 58 in spacer 34 which serve to provide dissipation of high pressure fluid across the face of the spacer 34. This is accomplished by allowing high pressure fluid to enter grooves 58 on the outlet side of the pump where it is diverted to passage 59 formed between the outer periphery of spacers 34 and body bearings 26 and 30. The fluid from passage 59 is diverted to inlet 52 through grooves 58.

FIGURE 4 is a transverse section through the main body bearing 26 and the axially slidable bearing 32 mounted within bearing 26. FIGURE 4 shows the manner in which the axially movable bearing 32 receives pressure loading through outlet port 56. As fluid enters through port 56, it flows via arcuate passage 57 to the rear radial surface 38 of bearing 32.

FIGURE 5 is a transverse cross-sectional view taken on lines 5—5 of FIGURE 1. There are slots 60 and 62 which allow passage of journal leakage from the base of the gear teeth on gears 18 and 28 into the inlet line 52.

As indicated above, there are axial passages 43 in the cylindrical inner wall of each of the pressure loadable bushings 28 and 32 to allow fluid to pass from the relief recesses 41 to a zone of lower pressure. For example, with respect to pressure loadable bearing 28, the fluid passes from chamber 53 via slot 60 to inlet and with respect to bearing 32, fluid passes from chamber 51 through passage 61 formed coaxially through journal 24 and gear 20 to place the fluid in communication with inlet 52 via slot 62. Fluid leakage between journal 22 and body bearing 26 will flow via port 63 to chamber 51, through passage 61 and in turn to slot 62 and inlet 52. Leakage between journal 24 and body bearing 30 also flows via slot 62 into inlet 52. The outlet 54, as well as body 10, closure member 13, and cap member 12, are also shown in FIGURE 5.

FIGURE 6 shows an exploded view of the parts of the pump assembly shown in FIGURE 1. As shown from left to right, there is a fragmentary cross-sectional view of body 10, and cross-sectional view of pilot ring 23 and axially movable bearing 32. The shaft pilot ring 23 and axially movable bearing 32 are mountable within body bearing 26. As indicated, the gears 18 and 20 are mountable inside of spacer plate 34 which fits concentrically over gears 18 and 20. Body bearing 30 is adapted to receive and carry the axially movable bearing 28 and is spaced from body bearing 26 by spacer plate 34. The aforementioned bearings and gears as well as closure plate 13 are held within body 10 by means of a cap member 12.

Through the utilization of this invention, the bearings are situated in a gear pump in a manner which eliminates the necessity of hand fitting of the bearings one to the other, i.e., fitting of the bearing flats. Also, the leakage caused by thermal expansion around the bearing flanges as well as leakage of pressure from the pressure loading chambers to inlet is substantially eliminated due to the ease of affording efficient sealing of the axially movable bearings.

It will be understood that while the invention has been described in connection with a certain specific embodiment of a gear pump, it is to be understood that this is by way of illustration and not by way of limitation; and this invention is applicable to many different designs of pressure loadable gear pumps. The scope of this invention is defined solely by the appended claims which should be construed as broadly as the prior art will permit.

What is claimed is:
1. A gear pump comprising:
a housing, said housing containing pumping chamber;
an inlet leading to and an outlet leading from said pumping chambers;
rotatable intermeshing pumping gears disposed in said pumping chambers for drawing fluid from said inlet, pressurizing the fluid, and forcing it out said outlet under pressure;
said gears provided with axially extending journals;
static body bearings and axially movable pressure loadable bearings disposed in said housing for rotatably supporting said axially extending journals;
each of said gears having a static body bearing and an axially movable pressure loadable bearing associated therewith, the axially movable bearing adapted to be axially moved along one of said journals into sealing engagement with said gears; and
each of said axially movable bearings being mounted within and carried by a static body bearing.

2. In a pressure loaded gear pump, the combination comprising:
a housing, said housing containing pumping chambers;
an inlet leading to and an outlet leading from said pumping chambers;
rotatable intermeshing pumping gears disposed in said pumping chambers for drawing fluid from said inlet, pressurizing the fluid, and forcing it out said outlet under pressure;
said gears provided with axially extending journals;
static body bearings and axially movable pressure loadable bearing means disposed in said housing for rotatably supporting said axially extending journals;
each of said gears having at least one axially movable pressure loadable bearing associated therewith which is adapted to be axially moved along one of said journals into sealing engagement with said gears; and
each of said axially movable pressure loadable bearings being mounted within and carried by a static body bearing, said body bearings being located on opposite sides of the gears whereby each of said axially movable pressure loadable bearings supports a journal of a gear, which journal is opposite a journal supported by a body bearing.

3. In a pressure loaded gear pump, the combination comprising:
a housing, said housing containing pumping chambers;
an inlet leading to and an outlet leading from said pumping chambers;
rotatable intermeshing pumping gears disposed in said pumping chambers for drawing fluid from said inlet, pressurizing the fluid, and forcing it out said outlet under pressure;
said gears provided with axially extending journals;
static body bearings and axially movable pressure loadable bearings disposed in said housing for rotatably supporting said axially extending journals;
each of said gears having at least one axially movable pressure loadable bearing associated therewith which is adapted to be axially moved along one of said journals into sealing engagement with said gears; and each of said axially movable bearings having biasing means associated therewith and being mounted within a static body bearing, said body bearings located on opposite sides of the gears whereby each of said axially movable pressure loadable bearings supports a journal of a gear, which journal is opposite a journal supported by a body bearing.

4. In a pressure loaded gear pump, the combination comprising:

a housing, said housing containing pumping chambers; an inlet leading to and an outlet leading from said pumping chambers;

rotatable intermeshing pumping gears disposed in said pumping chambers for drawing fluid from said inlet, pressurizing the fluid, and forcing it out said outlet under pressure;

said gears provided with axially extending journals;

at least two static body bearings and at least two axially movable pressure loadable bearings disposed in said housing for rotatably supporting said axially extending journals, said static body bearings being held apart from each other by a spacer plate which concentrically fits over said gears;

each of said gears having at least one of said axially movable pressure loadable bearings associated therewith which is adapted to be axially moved along said journals into sealing engagement with said gears; and each of said axially movable bearings being mounted within and carried by a static body bearing, said body bearings located on opposite sides of the gears whereby each of said axially movable pressure loadable bearings supports a journal of a gear, which journal is opposite the journal supported by a body bearing.

5. In a pressure loaded gear pump, the combination comprising:

a housing, said housing containing pumping chambers;

an inlet leading to and an outlet leading from said pumping chambers;

rotatable intermeshing pumping gears disposed in said pumping chambers for drawing fluid from said inlet, pressurizing the fluid, and forcing it out said outlet under pressure;

said gears provided with axially extending journals;

static body bearings and axially movable pressure loadable bearings disposed in said housing for rotatably supporting said journals;

said journals extending from each of said gears having a static body bearing and an axially movable pressure loadable bearing associated therewith;

said static body bearings situated on opposite sides of said gears and held in place by a spacer plate which concentrically fits over said gears;

each of said axially movable bearings being mounted within and carried by a static body bearing and adapted to be axially moved along said journal into sealing engagement with said gears; and each of said static body bearings supporting a journal of a gear, which journal is opposite a journal supported by an axially movable pressure loadable bearing.

6. In a pressure loaded gear pump, the combination comprising:

a housing, said housing containing pumping chambers; an inlet leading to and an outlet leading from said pumping chambers;

rotatable intermeshing first and second pumping gears disposed in said pumping chambers for drawing fluid from said inlet, pressurizing the fluid and forcing it out said outlet under pressure;

said gears provided with axially extending journals;

first and second static bearing means and first and second axially movable pressure loadable bearings disposed in said housing for rotatably supporting said journals;

said first static bearing means located on one side of said gears and including said first axially movable bearing associated with one journal of said first gear;

said second static bearing means located on the opposite side of said gears including said second axially movable bearing associated with one journal of said second gear;

said first and second static body bearings held in place by a spacer plate which concentrically fits over said gears; and each of said axially movable bearings adapted to be axially moved along said journals into sealing engagement with said gears.

References Cited by the Examiner
UNITED STATES PATENTS

| | | | |
|---|---|---|---|
| 2,079,375 | 5/1937 | McCollum | 103—126 |
| 2,641,192 | 6/1953 | Lindberg | 103—126 |
| 2,876,705 | 3/1959 | Aspelin | 103—126 |
| 2,932,254 | 4/1960 | Booth et al. | 103—126 |
| 3,055,308 | 9/1962 | Golfieri | 103—126 |
| 3,083,645 | 4/1963 | Donner et al. | 103—126 |
| 3,172,366 | 3/1965 | Laumont | 103—126 |

FOREIGN PATENTS

| | | |
|---|---|---|
| 358,843 | 10/1931 | Great Britain. |
| 769,763 | 3/1957 | Great Britain. |

MARK NEWMAN, *Primary Examiner.*

W. J. GOODLIN, *Assistant Examiner.*